J. W. RENO.
DEVICE FOR RAISING SUNKEN VESSELS.
APPLICATION FILED MAR. 17, 1921.

1,416,754. Patented May 23, 1922.
2 SHEETS—SHEET 1.

INVENTOR
Jesse W. Reno.
BY
L. H. Campbell
ATTORNEY

J. W. RENO.
DEVICE FOR RAISING SUNKEN VESSELS.
APPLICATION FILED MAR. 17, 1921.
1,416,754.
Patented May 23, 1922.
2 SHEETS—SHEET 2.
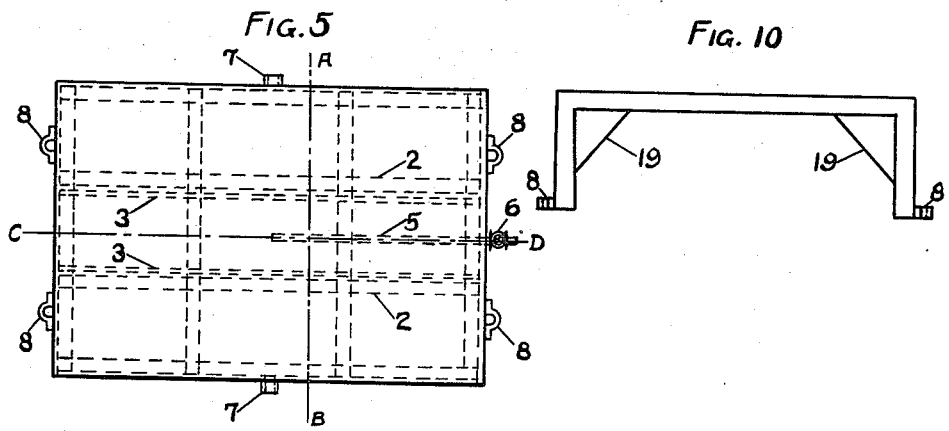
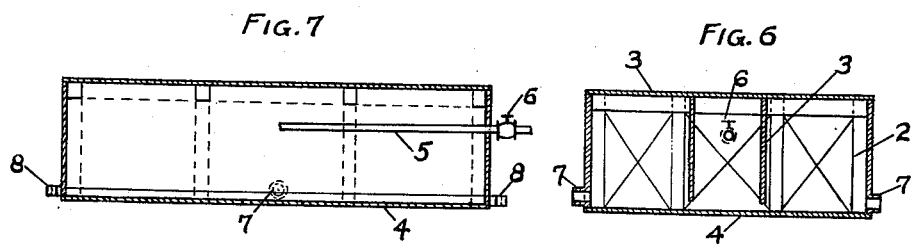
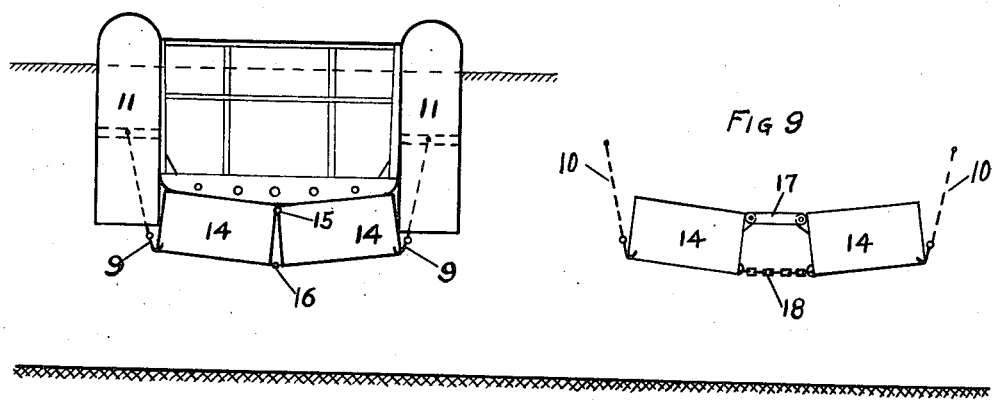
INVENTOR
Jesse W. Reno.
BY
L. H. Campbell
ATTORNEY

UNITED STATES PATENT OFFICE.

JESSE W. RENO, OF NEW YORK, N. Y.

DEVICE FOR RAISING SUNKEN VESSELS.

1,416,754.  Specification of Letters Patent.  Patented May 23, 1922.

Application filed March 17, 1921. Serial No. 453,108.

*To all whom it may concern:*

Be it known that I, JESSE W. RENO, a citizen of the United States of America, residing in New York, in the county of New York and State of New York, have invented a new and useful Improvement in Devices for Raising Sunken Vessels, of which the following is a specification.

My invention relates to a method and apparatus for raising sunken ships off of the sea bed to approximately the surface of the sea by means of vertical pontoons, secured to the ship, when the latter is resting on the bottom of the sea, and then by the buoyant force of the pontoons raising the ship as far as the buoyancy of the pontoons will raise it.

My invention has for its object more especially to complete the act of raising the ship approximately to the surface of the sea, by further raising the ship from that position to a higher level at which the deck of the ship is substantially awash with or above the surface of the sea.

In my United States Patents, Numbers 1,364,142 and 1,364,143, dated January 4, 1921, and by United States application for Letters Patent, Serial Number 398,481, filed by me July 23, 1920, I disclosed an improved apparatus for raising sunken ships from off of the bed of the sea sunk in deep water, more particularly, which involves the use of vertical pontoons, adapted to be let down in the sea at the side of the ship, and made fast thereto, by cables with hooks hooked into holes formed in the ship at the lowermost line for that purpose, and as near as possible to the bottom of the ship. Then by means of the buoyant force of the vertical pontoons, the ship is raised from off of the bed of the sea, and to within a comparatively short distance of its surface; the ship at such time and position being suspended in the sea, so to speak, from the pontoons. In waters where there is a considerable rise and fall of the tide, the next operation is to tow the suspended ship to a selected spot and ground her on the sea bed at high tide. Thereafter the pontoons are deflated, and unhooked from the ship. As the tide falls the water in the ship runs out of the holes in which the hooks formerly were, until at low tide there is comparatively but little water left in the ship. Whereupon the holes in the sides of the ship may be conveniently closed, an operation which can be readily accomplished by divers, and, when the tide rises again, the ship will float with the deck sufficiently high above the surface of the sea, and permit the remaining water within her to be pumped out, and the ship, then having but little draft, can be towed into a harbor.

But in waters where there is little or no tide, for instance, the Great Lakes, Mediterranean and Black and Baltic Seas, resort cannot be had to grounding the ship, and the falling of the tide to let the water in the ship run out of it through the holes in the side of the ship, and thereupon close them, and make use of the rising tide to float the ship, as described above.

My present invention is intended for use more especially in waters where there is virtually no tide to float the ship, as related above, and its especial object is to get around the difficulty or obstacle presented in the fact that, the deck of the ship is still beneath the surface of the sea when the ship is in its suspended position by the vertical pontoons, as also explained above, and will not be raised any further above that height by the pontoons in their then relative position, because at the time in question the limit of their lifting buoyant force is reached when the ship is lifted by them to that elevation, as will be further brought out hereinafter. There are also other objects of my invention which will appear in describing the invention.

I attain these objects by the apparatus illustrated in the accompanying drawings, in which:—

Figure 5 is a plan view of my box-shaped pontoon.

Figure 6 is a vertical sectional view of Figure 5, on the line A—B.

Figure 7 is a vertical sectional view of Figure 5 on the line C—D.

Figure 8 is a transverse sectional view of the ship, similar to the view in Figure 4, except that the box-shaped pontoon is divided into two parts, and hinged together at their upper edges, and connected together at their lower edges by a link.

Figure 9 is an end view of the two parts of the box-shaped pontoon, pivotally connected together at their upper edges by a strut, and at their lower edges by a chain.

Figure 10 is an end view of a modified form of my box-shaped pontoon, in which the bottom and end walls are omitted.

Similar numerals refer to similar parts throughout the several views.

Figure 1:
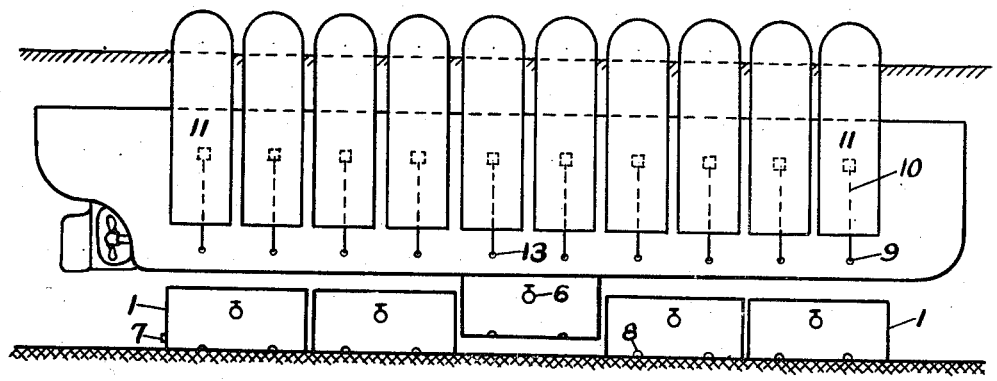
Figure 1 shows a sunken ship which has been raised approximately to below the surface by buoyant devices, secured to it, and towed to shallow water, and over my devices, on the sea bed, one of which has been allowed to rise against the bottom of the ship.

The ship having been raised from off of the bottom of the sea, by the vertical pontoons, to what may be conveniently called its suspended position in the sea, as depicted in Figure 1, for example, at which level the necessarily long vertical pontoons have brought the ship up with the deck say, for illustration, some fifteen feet below the surface of the sea, the ship is then towed to a convenient spot, where the sea is sufficiently shallow to enable me to carry out my invention, and where I have placed on the sea bed a number of my box-shaped pontoons, in the form of rectangular-shaped hollow boxes, 1, arranged side by side with each other, in a line corresponding substantially to the longitudinal line of the bottom of the ship. The boxes are virtually the same width as the bottom of the ship. Referring more particularly to Figures 5, 6 and 7, although the box is shown in Figures 1, 2, 3 and 4 also, it will be noted that I build the boxes very strong, inasmuch as they will have to support the weight of the ship, as will appear later on. In order to give them the required strength, I provide truss frames, 2, in their interior, running from side to side of the pontoons at certain intervals. They are also made impervious to air and water. In the interior of the pontoon, I arrange a pair of vertical walls or diaphragms, 3, transversely across the box, with their lower edge just short of touching the lower or under side, 4, of the pontoon. When the space between the lower edge of the diaphragms and the lower side of the pontoon is sealed with water admitted of the box, the diaphragms serve to form an air-tight chamber in the middle of the pontoon, which chamber can be filled with air independently of the two other chambers at the ends of the pontoon. See Figure 7. I intend to make my pontoons of box-shaped units, each of a size easily handled, say for example, fifty feet by forty feet by ten feet. An air pipe, 5, with a valve, 6, is provided to admit air to the central chamber, to cause the pontoon to rise from the sea bed, up against the bottom of the ship, as shown in Figure 1. The spaces or openings at the lower edges of the diaphragms allow air, when discharged into the central chamber, to pass therefrom to the end chambers as well, and charge them also with air. In order that water may be admitted to and discharged from the pontoon, 1, for the purpose of manipulating it in the operation of using it, two holes, 7, are made in its two longer sides, near their lower edge. By these expedients and the aid of compressed air, perfect control of the pontoons is obtained in lowering or sinking them from the surface of the sea to the bed thereof, manipulating them thereon, and subsequently causing them to rise in contact with the bottom of the ship. Furthermore, by regulating the amount of air admitted to or withdrawn from the pontoon, any degree of buoyancy of them is produced or maintained, between a minimum and maximum. On the short sides of the pontoon, at their lowermost edges, are securely fixed thereto, staples, 8, adapted to receive the hooks, 9, attached to the free end of the cables, 10, fastened to the vertical pontoons, 11. I purpose to tow the box-shaped pontoons to and over the site of their operation, and allow a sufficient quantity of water to enter them, and cause them to sink to the bottom of the sea. As the work with them will be prosecuted in comparatively shallow water, say, for instance, seventy-five feet, ordinary divers can be employed in locating and arranging the pontoons in position on the sea bed, side by side, in a line in the direction of the length of the ship. See Figure 1.

Assuming that they are arranged as mentioned on the bed of the sea, and the ship suspended by the vertical pontoons and in proper position over the box-shaped pontoons, air is then forced into the chambers of the latter, into one pontoon at a time, causing it to rise from off of the sea bed to and against the bottom of the ship, until all of the pontoons, one after another, are up from off of the sea bed, and against the bottom of the ship. When they are all against the bottom of the ship, it will be perfectly safe, because of the excess buoyancy obtained by their use, to deflate the vertical pontoons, one at a time, and allow it to sink lower in the sea, by the side of the ship, or draw it down by means of my submarine tractor and winch, disclosed in my United States Patent, Number 1,364,143.

Figures 3, 4:
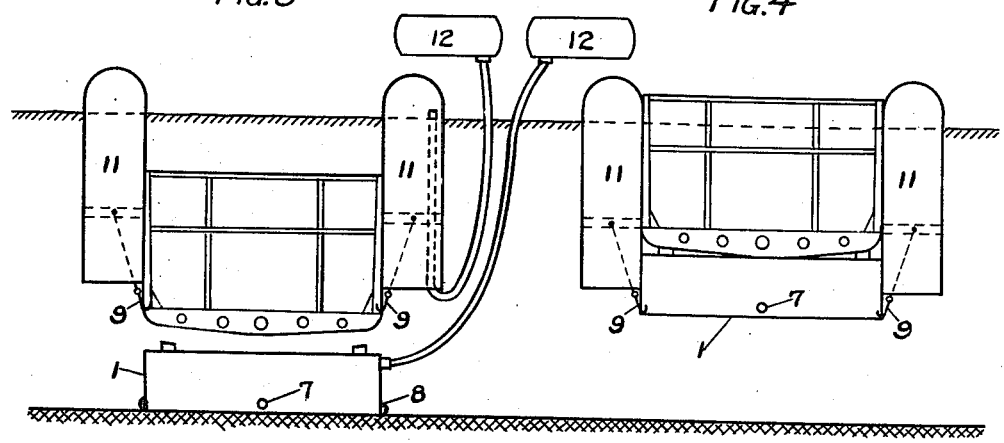
Figure 3 represents a view in cross section of the ship, shown in Figure 1, and one of my box-shaped pontoons under the bottom of the ship, and ready to be supplied with compressed air.
Figure 4 is a cross section of Figure 2, showing the vertical pontoons lowered relatively to the ship, and secured to the lower edges of my box-shaped pontoons.

In Figure 3, I have indicated a pipe upstanding in one of the vertical pontoons, with its open end above the water level, and its other end connected to an air compressor, 12, by means of which arrangement the vertical pontoon can be inflated or deflated as required. When a vertical pontoon has been sufficiently deflated, and permitted to sink to a lower position by the side of the ship, where the hook, 9, is opposite to a staple, 8, on the box-shaped pontoon, the hook is then manipulated and hooked into the staple, and thereupon the vertical pontoon is reinflated. It is preferred that the work of deflating and then re-inflating the vertical pontoons, and hooking them to the box-shaped pontoons, shall, if convenient, be carried on as near as may be with the two vertical pontoons opposite each other on either side of the ship, merely as that preference may serve to expedite the operation as a whole. It will be reflected that by this means and method described, an opportunity is made and availed of to lower the vertical pontoons to a lower position, and hook them to the side of the ship in effect at a much lower position than they were before, and also move the center of buoyancy, with relation to the ship, lower than it was, while all the time during the shifting, the ship is maintained suspended in the same position and against being lowered during the operation of changing the engagement of the hooks from the holes in the ship to the staples on the box-shaped pontoons. When the operation of hooking the vertical pontoons to the box-shaped pontoons is completed, the ship will thereupon be raised by the buoyant force of the pontoons, thus causing its deck to be well above the surface of the sea.

Figure 2:
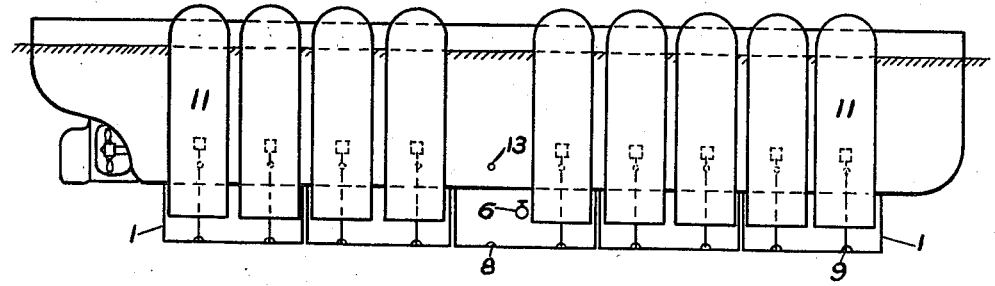
Figure 2 represents the ship shown in Figure 1, after my devices are raised against the bottom of the ship, and the vertical buoyant pontoons are in their lowered position relatively to the ship, and secured to the lower edges of the devices under the bottom of the ship; it also shows one of the vertical pontoons removed.

In Figures 2, 4 and 8, the ship is shown in such a position with its deck above the surface. It may be added that, as each vertical pontoon is unhooked from the side of the ship, preparatory to hooking it to a box-shaped pontoon, access can be had to the holes, 13, in the side of the ship, and an opportunity thereby given to stop them up, and, when they are closed, water in the ship can be pumped out at any convenient time, regardless of the tidal conditions. It will be observed that by allowing the box-shaped pontoons to rise from the sea bed against the bottom of the ship, there will be no danger of straining or distorting the bottom framing of the ship, which might be the case if the ship were allowed to rest on the sea bed. After the water has been pumped out of the ship, the vertical pontoons can be nearly deflated, and then, if the box-shaped pontoons are likewise deflated, they too may be permitted to sink, and the vertical pontoons can be unhooked and removed. The box-shaped pontoons will then be available and ready to be used again in the final raising of other ships. In fact, it will be practicable to carry out these secondary operations from a central location to which the ships raised from off of the sea bed in deep water can be towed.

In Figure 8 of the drawings, I have shown a modification of box-shaped pontoons, in which instead of forming the latter of one box, it is formed of two boxes, 14; or stated in another way, two box-shaped pontoons, 14, are shown, with a hinge, 15, at their upper edges, connecting the two boxes together. The lower edges of the two boxes are connected together by links, 16. The arrangement of two units or boxes, allows the pontoon to conform its upper surface to the curve of the ship's bottom, and again, the design may be found to be very serviceable and useful at the bow and stern of the ship. The links along the lower edges will take care of the tension strains to which the two boxes are subjected when in use.

In Figure 9, I have shown a pivoted strut, 17, linking the two boxes together at their upper edges, and which will also take care of the compression strain to which the two boxes may be subjected to in use. The struts make it possible to increase the span of the pontoon as a whole, and thus accommodate it to any width of ship. The chains, 18, connecting their lower edges will take care of the tension strains.

In Figure 10, a modification of the form of the box-shaped pontoon is shown; in which the bottom and end walls are omitted, and braces, 19, are provided between the top and side walls. In the case of this modification, the walls may be hollow, and the space be divided into compartments, and serve as air chambers; all of which is obvious, or the walls may be solid; either construction being within the discretion of the designer of the pontoon in embodying my invention, as disclosed herein. It will be apparent that the idea of my invention is to use the vertical pontoons to raise the ship as high as the limit of their effective buoyant force under the load will accomplish, as of first intention, so to speak; and to have them sustain the ship at their level and against being allowed to fall below it; and while they are so suspending the ship, nevertheless to re-use them to raise the ship further up, until its deck is above the surface of the sea. If the idea of my invention is fully comprehended upon a statement and description of it, as already presented, it will be reflected, in making a selection of a suitable body to be placed against the bottom of the ship, to which the vertical pontoons in their lower position will be secured, the fact that the said body shall be buoyant is not necessary, though it may be desirable, for the purposes disclosed above in describing the use of the hollow boxes; hence it will be perceived that the modified form of device, shown in Figure 10, is within the scope of my invention, whether it be buoyant or not.

Having described and shown herein my invention, what I desire to claim is:

1. In the art of raising the deck of a sunken ship above the surface of the sea, the combination of buoyant pontoons, adapted to be secured to the ship, and raise, and suspend it in the sea, and an element adapted to be placed against the bottom of the suspended ship, and have the buoyant pontoons detached from the ship and attached to the said element, to enable the buoyant force of the pontoons to raise the deck of the ship above the surface of the sea.

2. In the art of raising the deck of a sunken ship above the surface of the sea, the combination of vertical buoyant pontoons, adapted to be fixed to the ship by means of cables hooked in holes formed for that purpose in the sides of the ship, and raise the ship to a height in the sea denoted by the effective lifting buoyancy of the pontoons at that time, and suspend the ship so raised to that position, and a body or element adapted to lay against the bottom of the ship, and the buoyant pontoons, adapted to be detached from the ship and re-attached to the said body or element without lowering the ship, whereby and whereupon the buoyant pontoons will be enabled to complete the work of raising the ship until its deck is above the water.

3. In the art of raising the deck of a sunken ship above the water, which is suspended in the sea by means of buoyant bodies fixed to the ship, a buoyant pontoon, adapted to be placed under the bottom of the ship while suspended and adapted to be connected thereupon to the said buoyant bodies to enable them to continue their work of raising the ship until its deck is above the surface.

4. In the art of raising the deck of sunken ships above the surface of the sea, a rectangular hollow box-shaped pontoon, adapted to be placed under and against the bottom of the ship, and attached to buoyant bodies which raise the ship until its deck is above the water.

5. In the art of raising the deck of a sunken ship above the surface of the sea, a rectangular hollow box-shaped pontoon, air and water-tight, and divided into compartments, adapted to receive air under pressure or to have the air withdrawn therefrom, and water admitted therein or forced therefrom, and connected to buoyant devices which will raise the ship until its deck is above the surface of the sea.

6. In the art of raising the deck of a sunken ship above the surface of the sea, which ship has been raised by buoyant devices to a position near the surface, a rectangular-shaped hollow box pontoon, interiorly braced, to withstand compression and tension strains, and made air and water-tight, and provided with means whereby it is attached to the said buoyant devices, and adapted to lay against the bottom of the ship, and serve with the buoyant devices to enable them further to raise the ship until its deck is above the surface.

7. In the art of raising the deck of a sunken ship above the surface of the sea, which is suspended by buoyant devices, in a position near the surface, a pontoon unit, comprised of a pair of rectangular-shaped hollow boxes, pivotally fastened together at their upper edges and flexibly connected together at their lower edges, and provided with means whereby they can be secured to the said buoyant devices, and adapted to lay against the bottom of the ship, and conform more or less to the curve thereof, and serve with the buoyant devices in the operation of further raising the ship until its deck is above the surface of the water.

8. In the art of raising the deck of a sunken ship above the surface of the sea, which is suspended in a position near the surface by buoyant devices, a pontoon unit, comprised of a pair of substantially rectangular-shaped bodies or elements, pivotally fastened together at their upper edges by a strut, to take care of compression strains, and connected together at their lower edges by a flexible connection to take care of tension strains, and provided with means whereby they can be secured to the said buoyant devices, and adapted to lay against the bottom of the ship and conform more or less to its curve, and serve with the buoyant devices in the operation of raising the ship from its suspended position until its deck is above the surface.

9. In the art of raising the deck of a sunken ship above the surface of the sea, a rectangular hollow box-shaped pontoon, air and water-tight, divided into end and middle intercommunicating chambers, a pipe, with its open end in the middle chamber, means to discharge air under pressure and exhaust air, from the pontoon through the pipe, and openings in the end chambers to admit water to the pontoons and drain water therefrom.

10. In the art of raising the deck of a sunken ship above the surface of the water, the method herein described consisting in raising the ship from off of the sea bed to near the surface by buoyant devices attached to the ship and, while the ship is so suspended in such position, placing a body or element under and against the bottom of the ship, adapted to constitute a sling, as it were, and lowering the said buoyant devices and reattaching them in their lowered position to the said body or element, and then allowing the buoyant devices to raise the ship until its deck is above the surface.

11. In the art of raising the deck of a sunken ship above the surface of the sea, which ship has been raised to near the surface by means of buoyant devices, attached to the ship, and at which height the limit of the effective buoyant lifting force of the said buoyant devices has been reached, and while the ship is suspended in such position, the method herein described of arranging on the sea bed beneath the ship, bodies or elements, adapted to be caused to rise from off of the sea bed to and against the bottom of the ship, and adapted to have the said buoyant devices attached to them in their position against the bottom of the ship, detaching the said buoyant devices from the suspended ship, and lowering them and securing them to the said bodies or elements, and without lowering the position of the suspended ship, and thereafter allowing the buoyant devices to raise the ship until its deck is above the water.

In testimony whereof, I have signed my name to this specification.

JESSE W. RENO.